United States Patent [19]

Degginger et al.

[11] 3,726,911
[45] Apr. 10, 1973

[54] N-SUBSTITUTED (5,8-DIMETHYL-5,6,7,8-TETRAHYDRO-1-NAPHTHYL) CARBAMATES

[75] Inventors: Edward R. Degginger, Convent Station; James M. Balquist, Morristown, both of N.J.

[73] Assignee: Allied Chemical Corporation, New York, N.Y.

[22] Filed: Jan. 8, 1970

[21] Appl. No.: 1,567

[52] U.S. Cl. ......260/479 C, 260/471 C, 260/613 D, 260/621 R, 260/622 R, 260/622 P, 260/623 R, 260/624 E, 260/626 T, 424/300
[51] Int. Cl. ............................................C07c 125/06
[58] Field of Search .................260/491 C, 479 C

[56] References Cited

UNITED STATES PATENTS 3,035,969  5/1962  Hartle et al............................260/479
3,084,096  4/1963  Lambrech.............................260/471

*Primary Examiner*—James A. Patten
*Attorney*—Arthur J. Plantamura and Stanley M. Teigland

[57] ABSTRACT

Materials can be protected from attack by insects, mites and nematodes by applying to the material an N-substituted (5,6-dimethyl-5,6,7,8-tetrahydro-1-naphthyl)carbamate having the formula

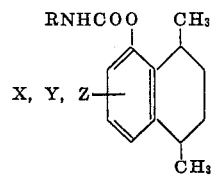

wherein R is a phenyl group or an alkyl radical; X, Y, and Z are substituents independently occupying the 2, 3, and 4 positions; X is hydrogen, fluorine, chlorine, bromine, or lower alkyl; Y is hydrogen, fluorine, chlorine, bromine, nitro, lower alkyl, or lower alkoxy; and Z is hydrogen or nitro. The carbamates, which are novel compounds, are prepared by reacting an isocyanate of the formula RNCO wherein R is as defined above with a 5,8-dimethyl-5,6,7,8-tetrahydro-1-naphthol having corresponding X, Y and Z substituents. The tetrahydronaphthol reactants wherein Z is hydrogen can be prepared by cyclialkylating a phenol having corresponding X and Y substituents (Y not being nitro) with 1,5-hexadiene in the presence of a catalyst such as aluminum phenate. Tetrahydronaphthols wherein Z and/or Y are nitro can be prepared by nitrating the cyclialkylation product.

6 Claims, No Drawings

N-SUBSTITUTED (5,8-DIMETHYL-5,6,7,8-TETRAHYDRO-1-NAPHTHYL) CARBAMATES

This invention relates to N-substituted, 5,8-dimethyl-5,6,7,8-tetrahydro-1-naphthyl carbamates and to their use as pesticides.

In accordance with this invention, materials can be protected from attack by a member of the group consisting of insects, mites, and nematodes by applying to the material an effective amount of an N-substituted (5,8-dimethyl-5,6,7,8-tetrahydro-1-naphthyl)carbamate having the formula

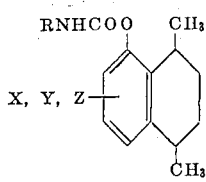

wherein R is an alkyl radical of 1 to 10 carbon atoms, phenyl or lower alkyl substituted phenyl; X, Y and Z are substituents independently occupying the 2,3, and 4 positions; X is hydrogen, fluorine, chlorine, bromine, or lower alkyl; Y is hydrogen, fluorine, chlorine, nitro, bromine, lower alkyl, or lower alkoxy; and Z is hydrogen or nitro, preferably hydrogen. The terms "lower alkoxy" and "lower alkyl" refer to such groups having from 1 to 4 carbon atoms.

The carbamate is applied to the material to be protected in the form of a pesticidal composition comprising the carbamate and a suitable diluent which forms a fine dispersion of the carbamate on plants or other materials to be protected. Suitable solid diluents include talcums, diatomaceous earth, wood flours, and silica gels. Where the diluent is a solid, the composition preferably contains from 0.1 to 1.0 weight percent of the carbamate. Suitable liquid diluents include water, acetone, petroleum distillates and the like. Where the diluent is a liquid, the composition can contain as little as about 0.5 pound of carbamate per 100 gallons of diluent, the preferred concentration being from 0.5 to 2 pounds of carbamate per 100 gallons of diluent. Other pesticidal adjuvants, including conventional wetting, dispersing, and emulsifying agents, can also be added to the formulation. The amount of carbamate deposited on the material can range from 0.01 to 1.0, preferably 0.1 to 0.5 pounds of carbamate per square yard of material. No phytotoxicity is shown by any of the carbamates.

The carbamates of this invention can be prepared by reacting a 5,8-dimethyl-5,6,7,8-tetrahydro-1-naphthol having corresponding X, Y, and Z substituents with an isocyanate of the formula RNCO wherein R is an alkyl or phenyl radical as defined above. The alkyl and phenyl radicals may contain substituents, such as halogen atoms, which do not adversely affect the pesticidal effectiveness of the carbamates. The alkyl radical can include a cycloaliphatic ring and can also contain other atoms, such as oxygen forming an ether linkage, in the alkyl chain. R is preferably phenyl or an alkyl radical of 1 to 6 carbon atoms. The reaction is preferably carried out in the presence of an excess of the isocyanate, which also serves as a solvent for the naphthol. In addition, it is desirable, but not absolutely necessary, to add a small amount of an organic base such as triethylamine to the reaction mixture in order to catalyze carbamate formation. The reaction, which is exothermic, proceeds readily without the external addition of heat. When the reaction mixture is heated to reflux for a brief period, such as about thirty minutes, a nearly quantitative yield of carbamate is obtained. The carbamates can be recovered from the reaction mixture by removing unreacted isocyanate under reduced pressure, followed by recrystallization of the residue.

The tetrahydronaphthols from which the carbamates of this invention are derived can be prepared by reacting, in the presence of a suitable catalyst, 1,5-hexadiene with a phenol having the formula:

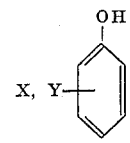

wherein X and Y independently occupy the 2, 3 or 4 positions; X is hydrogen, fluorine, chlorine, bromine, or lower alkyl; and Y is hydrogen, fluorine, chlorine, bromine, lower alkyl or lower alkoxy. The reaction product is a 5,8-dimethyl-5,6,7,8-tetrahydro-1-naphthol having substituents in the 2, 3, and 4 positions corresponding to the substituents in the 2, 3, and 4 positions of the substituted phenol reactant. If Y is lower alkoxy, X is preferably hydrogen; if Y is halogen, X is preferably hydrogen or a like halogen; and if Y is lower alkyl, X is preferably hydrogen or lower alkyl. Carbamates wherein X and Y are both hydrogen are also preferred.

Suitable catalysts for preparing the tetrahydronaphthol reactant include boron trifluoride etherate and aluminum phenate (triphenoxyaluminum), with aluminum phenate being preferred. The aluminum phenate catalyst can be prepared in situ by heating a suspension of aluminum and the substituted phenol to be employed in the cyclialkylation reaction to between about 150°C and 200°C until hydrogen evolution has ceased. Alternatively, the aluminum phenate catalyst can be prepared beforehand from the same or different phenolic reactant and stored prior to use. Hence, as used herein, the term "aluminum phenate" includes aluminum phenates derived from unsubstituted phenol and substituted phenols having the formula:

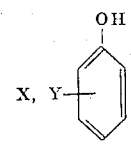

wherein X and Y are as defined herein.

The weight ratio of catalyst to 1,5-hexadiene can be from about 1:100 to about 1:0.5, with the preferred ratio being from about 1:10 to about 1:1.

The reactants can be added to the reaction mixture in any desired ratio, but normally it is desirable to employ an excess of the substituted phenol to avoid undesirable side reactions producing higher molecular weight by-products. If desired, an inert solvent can also be added to the reaction mixture. Suitable solvents include chlorobenzene and nitrobenzene. Lower boiling solvents, such as carbon disulfide, can also be used at the temperatures employed when boron trifluoride etherate is used as the catalyst.

An alternative method of preparing the tetrahydronaphthols of this invention wherein X and/or Y are chlorine or bromine comprises treating with chlorine or bromine a 5,8-dimethyl-5,6,7,8-tetrahydro-1-naphthol having either or both of the 2 and 4 positions unsubstituted. It is desirable, but not essential, to carry out the reaction with the tetrahydronaphthol reactant dissolved in an inert solvent, such as dioxane. The reaction proceeds readily at ambient temperatures. Both mono- and dihalogenated products (separable by fractional distillation) can be prepared by this method.

The tetrahydronaphthols of this invention wherein Z and/or Y are nitro are prepared by treating with nitric acid a 5,8-dimethyl-5,6,7,8-tetrahydro-1-naphthol having either or both of the 2 and 4 positions unsubstituted. The concentration of the nitric acid is not especially critical and can range from about 10 to about 90 percent, with the range 70 to 90 percent being preferred. The reaction proceeds readily at ambient temperature, but temperatures ranging from 0°C to 100°C can be used if desired. It is desirable, but not essential, to carry out the reaction with the tetrahydronaphthol reactant dissolved in an inert solvent, such as ether. Both mono- and dinitro products (separable by chromatography) can be prepared by this method.

The following examples further illustrate the invention. In each of the examples the reaction products were identified by infrared spectrum and nuclear magnetic resonance analyses.

EXAMPLES 1–7

Derivatives of phenol were cyclialkylated by reaction with 1,5-hexadiene in the presence of aluminum phenate. Aluminum phenate was prepared in situ by heating a suspension of the phenol and aluminum to between 150°C and 200°C until hydrogen evolution had ceased. 1,5-hexadiene was then added slowly at a rate such that the temperature of the reaction mixture did not drop below 160°C. The reaction mixture was held at the indicated temperature for the indicated period of time after the addition was completed. The reaction mixture was then cooled, poured onto a system of ice and hydrochloric acid, extracted with ether and then dried over sodium sulfate. The desired 5,8-dimethyl-5,6,7,8-tetrahydro-1-naphthol was then isolated by distillation. The results obtained are tabulated below in Table I.

added to a rapidly stirred solution of 8.7 grams of 5,8-dimethyl-5,6,7,8-tetrahydro-1-naphthol in 100 ml of dioxane until a yellow color persisted (about 75 ml required). The dioxane solution was poured into 200 ml of water and sodium bisulfite was added to discharge the color. The solution was saturated with sodium chloride and extracted with methylene chloride. The organic phase was dried over sodium sulfate, concentrated under vacuum, and distilled to give 15.5 grams of 2,4-dibromo-5,8-dimethyl-5,6,7,8-tetrahydro-1-naphthol, boiling point 137–139°C at 0.9 mm Hg.

EXAMPLE 9

A solution of 10 grams of 5,8-dimethyl-5,6,7,8-tetrahydro-1-naphthol in 200 ml of ether was treated with 50 ml of 90 percent nitric acid with external cooling. The ether solution was then extracted several times with water, dried over sodium sulfate and concentrated to dryness under vacuum. The residue was chromatographed using a 50 × 4.5 cm column of silica gel and eluted with a 1:1 solution of hexane and chloroform. The first 1300 ml of eluent were concentrated to dryness and the residue was crystallized from hexane to give 7.6 grams of yellow crystals, melting point 72°–88°C. These crystals were rechromatographed with hexane (300 ml) to give 1.5 grams of yellow crystals, melting point 101°–102°C, identified as 5,8-dimethyl-4-nitro-5,6,7,8-tetrahydro-1-naphthol. Further elution with a 4:1 soltuion of hexane and chloroform afforded 5.0 grams of yellow-green crystals, melting point 92°–94C, identified as 5,8-dimethyl-2,4-dinitro-5,6,7,8-tetrahydro-1-naphthol.

EXAMPLE 10

One-half ml of triethylamine was added to a stirred solution of 3.8 grams of 5,8-dimethyl-5,6,7,8-tetrahydro-1-naphthol and 10 ml of methyl isocyanate. When the initial reaction had moderated, the solution was heated to reflux for 15 minutes, cooled, and the excess isocyanate removed under reduced pressure. The viscous oil that remained was recrystallized from chloroform-hexane to give 2.1 grams of product. Concentration of the mother liquor afforded an additional 1.0 grams of product. Two recrystallizations of the product from hexane gave white crystals, melting point 100.5°–102°C, identified as N-methyl (5,8-dimethyl-5,6,7,8-tetrahydro-1-naphthyl)carbamate.

The carbamate prepared above was diluted with a 1:1 solution of acetone and water to a concentration

TABLE I

| Phenol | Grams phenol | Grams aluminum | Grams 1,5-hexadiene | Reaction temp., °C. | Reaction time, hours | Grams 5,6,7,8-tetrahydro-1-naphthol (yield) | Boiling point, °C./mm. Hg |
|---|---|---|---|---|---|---|---|
| Unsubstituted | 150 | 3 | 34.6 | 180–185 | 3.5 | 41 | 98–100/1.0 |
| 2-methyl | 208 | 3 | 51.7 | 160–170 | 4 | 78 | 92–93/0.5 |
| 3-methyl | 200 | 4 | 51.7 | 170–180 | 4 | 39 | 120–130/0.2–0.3 |
| 4-methyl | 220 | 4 | 51.7 | 160–185 | 5 | 58 | 99–103/0.25 |
| 4-ethyl | 200 | 4 | 51.7 | 190–215 | 6 | 42 | 110–114/0.8 |
| 2-isopropyl | 135 | 3 | 34.6 | 200–215 | 2 | 56 | 110–113/0.3 |
| 4-methoxy | 200 | 4 | 51.7 | 215–230 | 2 | 51 | 135–145/0.5 |

EXAMPLE 8

A solution of 45 grams of potassium bromide, 30 grams of bromine, and 300 ml of water was slowly corresponding to one pound of carbamate per 100 gallons of diluent. The solution was sprayed on cranberry bean plants which were subsequently infested with Mexican bean beetle larvae after the solution had dried on the plants. The solution was also sprayed on English broad beans and pea aphid adults, separately, and then the aphids were placed on the treated plants. In addition, the solution was sprayed on cranberry bean plants infested with two-spotted spider mites. A portion of the solution was stripped of acetone, diluted with water to a concentration of 500 ppm of carbamate, combined with 0.1 percent by weight of Triton X-155 wetting agent, and sprayed on sour mash nematodes (*Panagrellus redivivus*). Mortality observations were made three days after treatment. The percent of nematodes killed was determined by visual estimate using a microscope. The results are reported in Table II.

EXAMPLES 11–23

Other N-substituted carbamates were prepared following the general procedure of Example 10 from certain other naphthols. These carbamates were similarly tested for pesticidal effectiveness following the procedure of Example 10, with the exception that the concentration of the carbamate was equivalent to two pounds of carbamate per 100 gallon of diluent. The results are reported below in Table II.

TABLE II

| R | Carbamate | | | Percent Killed | | | |
|---|---|---|---|---|---|---|---|
| | X | Y | Z | MBBL[1] | PAA[2] | TSSM[3] | NEM[4] |
| CH$_3$ | H | H | H | 100 | 80 | 7 | 35 |
| CH$_3$ | 4-methyl | H | H | 100 | 0 | 5.9 | 20 |
| CH$_3$ | 4-chloro | H | H | 100 | 0 | 18.7 | 10 |
| CH$_3$ | 2-methyl | H | H | 20 | 0 | 14.3 | 100 |
| CH$_3$ | 4-ethyl | H | H | 40 | 100 | 4.2 | 10 |
| CH$_3$ | 2-isopropyl | H | H | 0 | 10 | 17.6 | 5 |
| CH$_3$ | 4-methoxy | H | H | 40 | 0 | 13.3 | 10 |
| CH$_3$ | 3-methyl | H | H | 100 | 100 | 57.1 | 10 |
| C$_6$H$_5$ | H | H | H | 20 | 0 | 33.3 | 10 |
| c—C$_6$H$_{11}$ | H | H | H | 60 | 0 | 15.4 | 5 |
| CH$_3$(CH$_2$)$_3$ | H | H | H | 40 | 0 | 53.9 | 10 |
| CH$_3$(CH$_2$)$_5$ | H | H | H | 60 | 0 | 100 | 10 |
| CH$_3$ | 2-bromo | 4-bromo | H | 100 | 0 | 0 | 10 |

[1] Mexican bean beetle larvae
[2] Pea aphid adults
[3] Two-spotted spider mites
[4] Sour mash nematodes

We claim:

1. An N-substituted 5,8-dimethyl-5,6,7,8-tetrahydro-1-napthyl carbamate having the formula

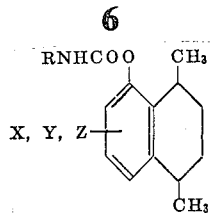

wherein R is an alkyl radical of 1 to 6 carbon atoms or phenyl; X is hydrogen, Y is a lower alkoxy and Z is hydrogen.

2. An N-substituted 5,8-dimethyl-5,6,7,8-tetrahydro-1-napthyl carbamate having the formula

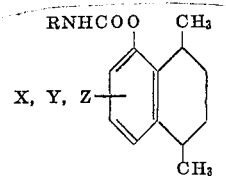

wherein R is an alkyl radical of 1 to 6 carbon atoms or phenyl; X is hydrogen, Y is fluorine, chlorine or bromine and Z is hydrogen.

3. An N-substituted 5,8-dimethyl-5,6,7,8-tetrahydro-1-napthyl carbamate having the formula

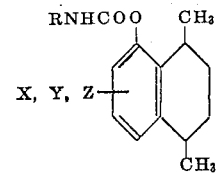

wherein R is an alkyl radical of 1 to 6 carbon atoms or phenyl; X and Y are lower alkyl and Z is hydrogen.

4. An N-substituted 5,8-dimethyl-5,6,7,8,-tetrahydro-1-napthyl carbamate having the formula

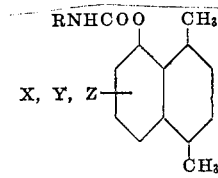

wherein R is an alkyl radical of 1 to 6 carbon atoms or phenyl; X is a lower alkyl and Y and Z are hydrogens.

5. The carbamate of claim 4 wherein R is an alkyl radical of 1 to 6 carbon atoms.

6. The carbamate of claim 5 wherein R is methyl and X is methyl occupying the 3 position.

* * * * *